United States Patent
Lee et al.

(10) Patent No.: US 8,046,905 B2
(45) Date of Patent: Nov. 1, 2011

(54) MOTOR MANUFACTURING METHOD

(75) Inventors: Ta-Kyoung Lee, Suwon-si (KR);
Duck-Young Kim, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/588,090

(22) Filed: Oct. 2, 2009

(65) Prior Publication Data

US 2010/0018031 A1    Jan. 28, 2010

Related U.S. Application Data (62) Division of application No. 11/882,588, filed on Aug. 2, 2007, now abandoned.

(30) Foreign Application Priority Data

Aug. 8, 2006   (KR) .................. 10-2006-0074555

(51) Int. Cl.
*H02K 15/02*   (2006.01)
(52) U.S. Cl. ............... 29/596; 29/603.03; 29/898.02; 360/224; 384/107
(58) Field of Classification Search .......... 29/596, 29/603.03, 898.02; 360/224; 384/107, 108
See application file for complete search history.

(56) References Cited

U.S. PATENT DOCUMENTS

| | | | |
|---|---|---|---|
| 4,955,791 A | | 9/1990 | Wrobel |
| 5,141,338 A | * | 8/1992 | Asada et al. ................ 384/114 |
| 5,724,718 A | * | 3/1998 | Moir et al. ................ 29/603.03 |
| 6,787,954 B2 | | 9/2004 | Yoshitsugu et al. |
| 6,832,853 B2 | | 12/2004 | Fujinaka |

FOREIGN PATENT DOCUMENTS

| | | |
|---|---|---|
| JP | 6-70464 | 9/1994 |
| JP | 7-4428 | 1/1995 |
| JP | 9-163664 | 6/1997 |
| JP | 2002-165407 | 6/2002 |
| JP | 2004-289967 | 10/2004 |

OTHER PUBLICATIONS

U.S. Appl. No. 11/882,588, filed Aug. 2, 2007, Ta-Kyoung Lee et al., Samsung Electro-Mechanics Co., Ltd.
Korean Patent Office Action, mailed Aug. 23, 2007 and issued in corresponding Korean Patent Application No. 10-2006-0074555.
Office Action issued in parent U.S. Appl. No. 11/882,588 mailed Oct. 30, 2008.
Office Action issued in parent U.S. Appl. No. 11/882,588 mailed Dec. 15, 2008.
Office Action issued in parent U.S. Appl. No. 11/882,588 mailed Jun. 2, 2009.
Japanese Office Action issued Aug. 4, 2009 in corresponding Japanese Patent Application 2007-201145.

* cited by examiner

*Primary Examiner* — Livius R Cazan (57) ABSTRACT

A method of manufacturing a motor includes coupling a base cover to a sleeve having a penetration hole formed therein, such that one side of the penetration hole is closed; inserting a shaft in the penetration hole; coupling a plate to the shaft such that the shaft is inserted in the plate; and pressing and coupling a hub to the shaft such that the shaft is inserted in the hub while the base cover is supported in an axial direction of the shaft to the base cover by using a jig, wherein the base cover is elastically deformed to make contact with the shaft. In the method of manufacturing the motor, the jig is used to deform the base cover so as to come in contact with the shaft, thereby applying the support load in the axial direction.

3 Claims, 8 Drawing Sheets

MOTOR MANUFACTURING METHOD

CROSS-REFERENCE TO RELATED APPLICATIONS

This application is a divisional and claims priority to U.S. application Ser. No. 11/882,588, filed Aug. 2, 2007, which has been abandoned, which in turn claims the benefit of Korean Patent Application No. 10-2006-0074555 filed with the Korean Intellectual Property Office on Aug. 8, 2006, the disclosures of which are incorporated herein by reference in their entirety.

BACKGROUND

1. Field

The claimed invention relates to a motor manufacturing method.

2. Description of the Related Art

In general, a motor, especially a spindle motor, is used to operate the rotating polygonal mirror of a laser printer or the disk of a hard disk drive, etc. That is, various rotational bodies may be fixed as necessary to the outer perimeter of the hub. For example, in the case of an LSU (laser scanning unit), a rotating polygonal mirror may be installed, while in the case of a hard disk drive, a disk may be installed.

Figure 1:
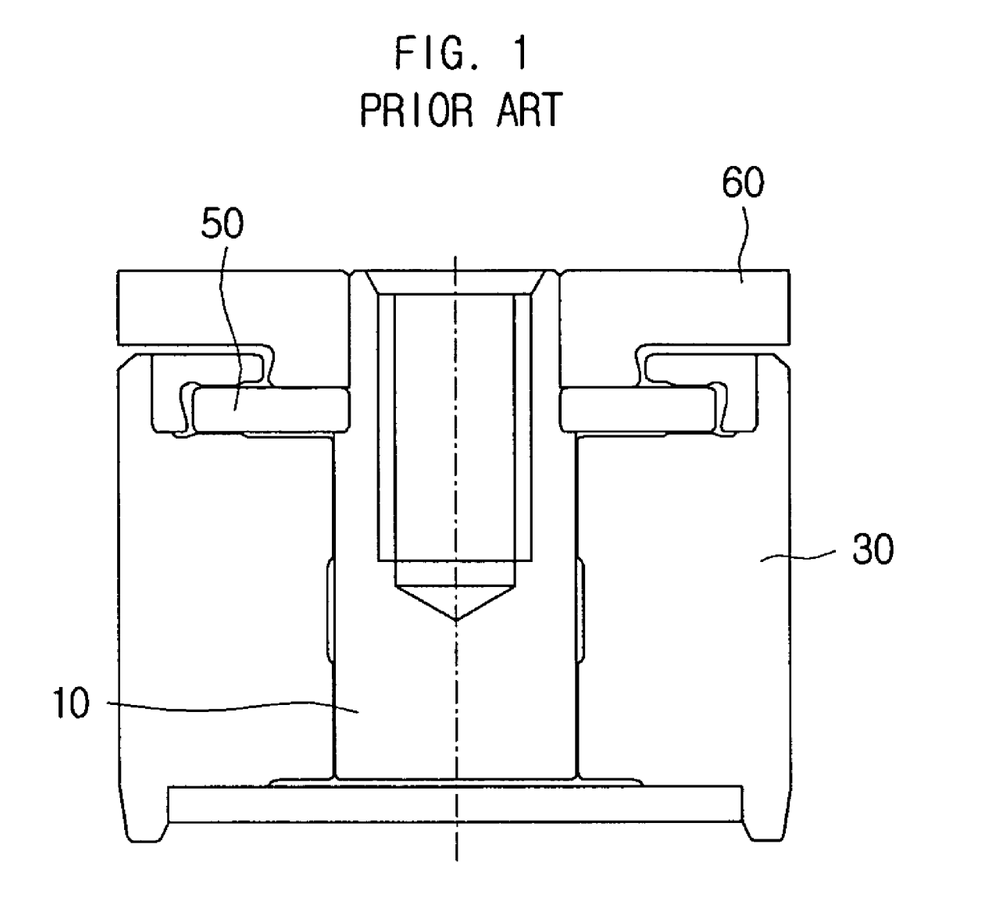
FIG. 1 is a cross-sectional view illustrating the structure of a motor according to prior art.

FIG. 1 is a cross-sectional view illustrating the structure of a motor according to prior art. In the case of the motor illustrated in FIG. 1, while pressing on the hub 60 for the coupling of the shaft 10 inserted in the sleeve 30 with the hub 60, the force is concentrated on the portion where the shaft 10 and plate 50 are coupled, causing a risk of mechanical damage.

However, if the hub is pressed with a load relatively less than that which causes mechanical damage, a sufficient load may not be applied, and as the gaps between components, etc., deviate further from the designed dimensions, problems may occur as the motor cannot perform operations in a stable manner.

SUMMARY

An aspect of the claimed invention is to provide a motor having high precision with less deviation from the designed dimensions, using a base cover made of an elastically deformable material that can be made to touch the shaft by pressing.

Also, an aspect of the claimed invention is to provide a method of manufacturing a motor with which deviations from the designed dimensions can be minimized, by coupling a hub onto a shaft by pressing such that the shaft is inserted, while supporting a base cover in the axial direction of the shaft.

One aspect provides a motor which includes a stationary member, a rotating member coupled to the stationary member which rotates about an imaginary rotational axis, and a base cover which covers one side of the stationary member and the rotating member, where the base cover is made of a material which can be elastically deformed by pressing to touch the stationary member or the rotating member.

The stationary member may include a sleeve in which a penetration hole is formed, and the rotating member may include a shaft which is inserted in the penetration hole.

A donut-shaped plate may additionally be included, which has a first hole corresponding to the cross-section of the shaft, and which is coupled with the shaft, such that the shaft is inserted in the first hole, and mounted on the other side of the sleeve. Also, a cap may additionally be included, which covers at least a portion of the plate and which is mounted on one side of the sleeve.

The base cover may have a shape corresponding to the shape of one side of the stationary member or the rotating member, and a ledge may be formed on the stationary member or on the rotating member such that one side is sunken in or protruded out.

Another aspect provides a method of manufacturing a motor which includes coupling a base cover to a sleeve, in which a penetration hole is formed, such that one side of the penetration hole is closed; inserting a shaft in the penetration hole; coupling a plate to the shaft, such that the shaft is inserted in the plate; and pressing and coupling a hub to the shaft, such that the shaft is inserted in the hub, while the base cover is supported in an axial direction of the shaft.

The pressing and coupling of the hub may include applying a particular support load such that the base cover is elastically deformed, where the support load may be a load corresponding to a deforming amount for the base cover to touch the shaft.

An operation of coupling a cap to the sleeve such that the plate is covered by the cap may further be included, between the coupling of the plate and the pressing and coupling of the hub.

Also, an operation of forming a fluid bearing in the gap between the sleeve and the shaft and in the gap between the shaft and the base cover may further be included.

Additional aspects and advantages of the present invention will become apparent and more readily appreciated from the following description, including the appended drawings and claims, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings in which.

DETAILED DESCRIPTION OF THE EMBODIMENTS

The motor and manufacturing method thereof according to certain embodiments of the invention will be described below in more detail with reference to the accompanying drawings, in which those components are rendered the same reference number that are the same or are in correspondence, regardless of the figure number, and redundant explanations are omitted.

In general, a motor consists basically of a rotating member, a stationary member that supports the rotating motion of the rotating member, and a bearing placed between the rotating member and the stationary member. For example, the rotating member may be a coupled body including a shaft, a hub coupled to and rotating together with the shaft, and a plate, etc., and the stationary member may be a sleeve, etc., surrounding the shaft.

However, the rotating member and the stationary member are not determined by the components per se, but are determined by their designed functions. That is, there may be cases where the shaft is fixed and the sleeve surrounding the shaft is rotated, in which case the shaft may become the stator and the sleeve may become the rotor.

In the embodiments of the invention described below, the descriptions will be set forth for the cases where the sleeve acts as the stationary member and the shaft and the plate and hub coupled to the shaft serve act as the rotating member. However, it is to be appreciated that the embodiments of the claimed invention are not thus limited.

Figure 2:
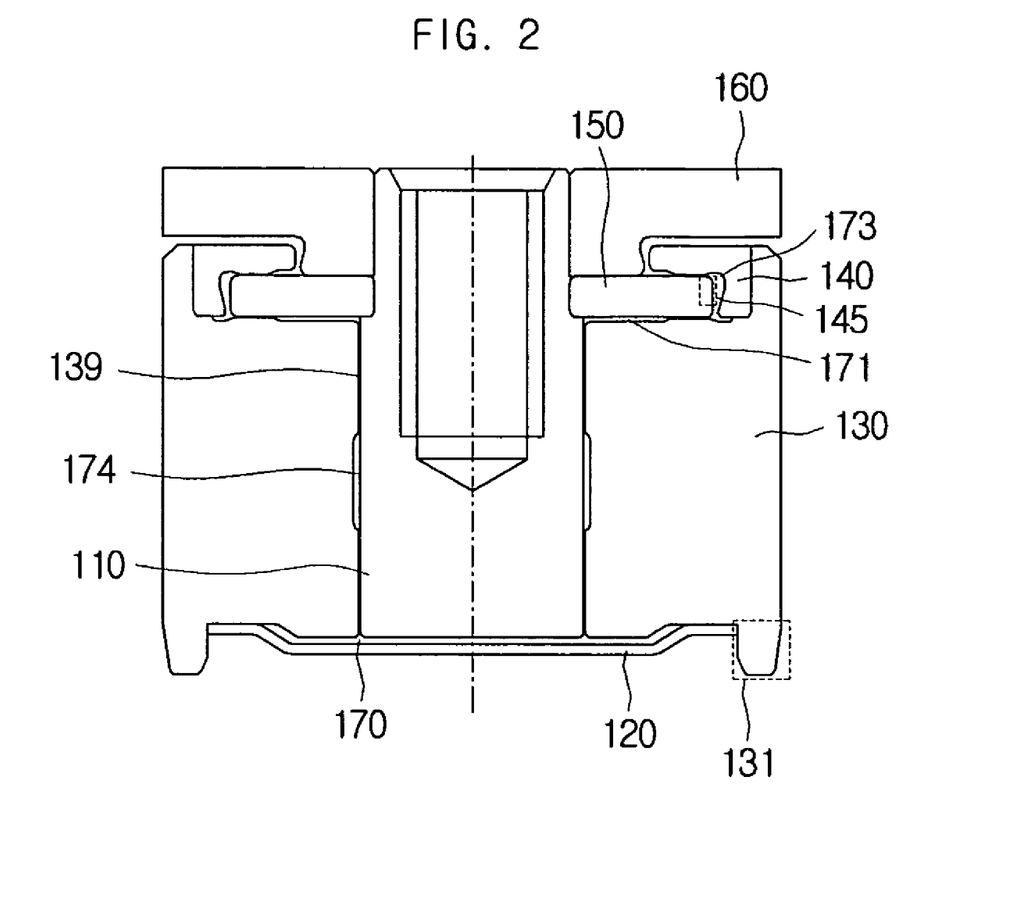
FIG. 2 is a cross-sectional view illustrating the structure of a motor according to a first embodiment.

FIG. 2 is a cross-sectional view illustrating the structure of a motor according to a first disclosed embodiment of the invention. In FIG. 2 are illustrated a shaft 110, base cover 120, sleeve 130, cap 140, plate 150, hub 160, and reservoir 170.

The motor according to this embodiment may be coupled to the sleeve 130 from the other side of the shaft 110 to cover the penetration hole, where the base cover 120 may be made of an elastically deformable material that can be made to touch the shaft 110 by pressing.

The shaft 110 may be the central axis for rotational motion, and may rotate together as a single body with the hub 160 described later. The shaft 110 may be inserted into the penetration hole 139 of the sleeve 130 described below.

The sleeve 130 may cover the outer perimeter of the shaft 110 to maintain stable rotating movement of the shaft 110. A penetration hole 139 is formed in the sleeve 130 through which the shaft 110 may be inserted, and as the shaft 110 is inserted in the penetration hole 139 and covered, the shaft 110 may be supported by the sleeve 130 during the rotating movement.

A ledge 131 may be formed on the sleeve 130 such that the other side, to which the base cover 120 is coupled, is sunken in. Conversely, a ledge 131' may be formed such that the other side, to which the base cover 120 is coupled, is protruded out. The base cover 120 may be formed to be in correspondence with the shape of this other side of the sleeve 130.

Figure 3:
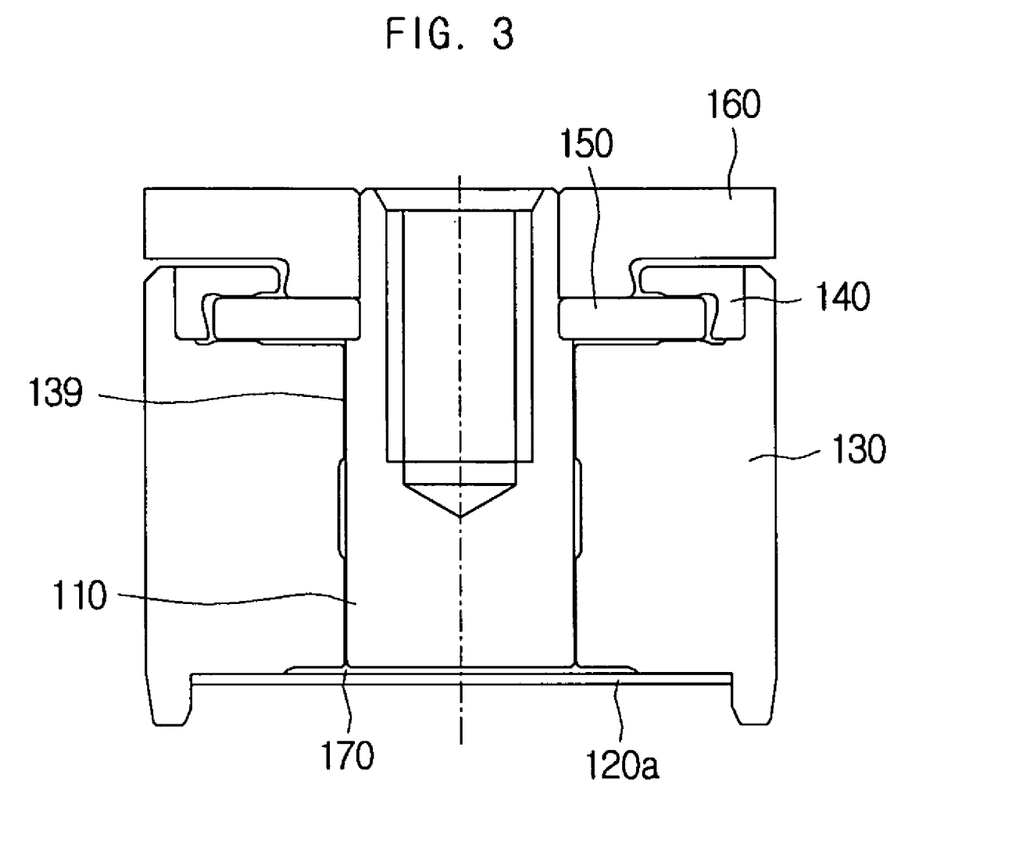
FIG. 3 is a cross-sectional view illustrating the structure of a motor according to a second embodiment.

Referring to FIGS. 2 and 3, it is seen that a ledge 131 is formed such that the other side of the sleeve 130, to which the base cover 120 is coupled, is sunken in. Correspondingly, the base cover 120 is formed with a shape such that makes the outer perimeter of the base cover 120, 120a be covered by the ledge 131. This may allow convenient coupling of base cover 120 with the sleeve 130, and may also provide secure coupling.

FIG. 3 is a cross-sectional view illustrating the structure of a motor according to a second disclosed embodiment of the invention. In the case of the embodiment shown in FIG. 3, as the base cover 120a may be shaped as a flat plate without any curving, not only can the coupling of the base cover and the sleeve be made easier, but also the processing and manufacture of the base cover can be made simpler.

Figure 4:
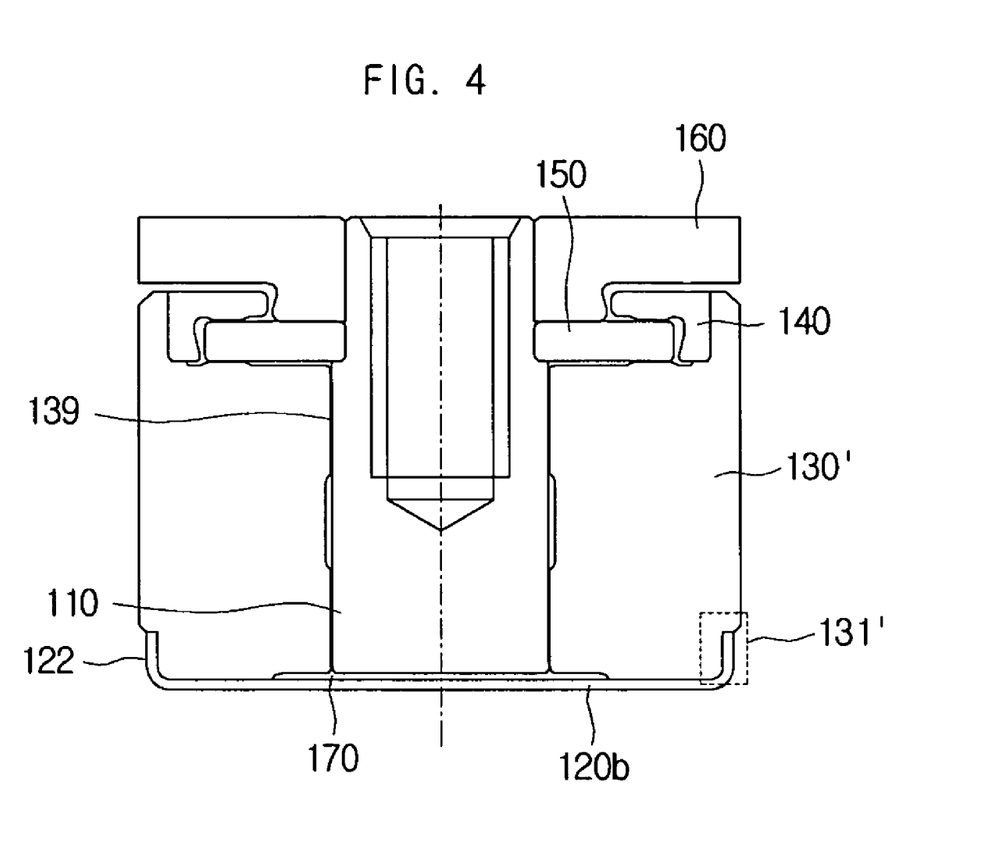
FIG. 4 is a cross-sectional view illustrating the structure of a motor according to a third embodiment.

With regards another embodiment, in FIG. 4, it is seen that a ledge 131' is formed such that the one side of the sleeve 130', to which the base cover 120b is coupled, is protruded out. Curves 122 are formed at the end portion of the base cover 120b in correspondence to such a shape of the sleeve 130', whereby the base cover 120b has a shape that allows it to cover the ledge 131' of the sleeve 130'. This offers a more convenient way of coupling the base cover 120b and sleeve 130', as well as a more secure coupling. A radial bearing, described below, may be placed in the gap between the sleeve 130 and the shaft 110.

The radial bearing 174 may be a fluid bearing, which may be placed in the gap between the sleeve 130 and the shaft 110, and may support the shaft 110 during the rotating movement of the shaft 110 to maintain stable rotating movement of the shaft 110.

The radial bearing 174 may be formed by injecting oil in the gap between the shaft 110 and sleeve 130. However, while oil is suggested in this embodiment for forming the radial bearing 174, it is apparent that various alternatives may be used according to design requirements.

The base cover 120 may cover the penetration hole 139 on the other side of the shaft 110. The base cover 120 may be coupled to the sleeve 130, and by forming the base cover 120 to have a shape that is in correspondence with the shape of the side of the sleeve 130 to which the base cover 120 is coupled, a more secure coupling may be obtained.

In addition, the base cover 120 may be made with a material that can be elastically deformed. Thus, during the assembly of a motor according to this embodiment, the shaft 110 can be inserted into the penetration hole 139 of the sleeve 130 easily and with precision, by applying a support load on the base cover 120. This will be described later in more detail.

A reservoir is formed in the gap between the base cover 120 and the sleeve 130, a description of which is provided below.

The reservoir 170 may be formed in the gap between the base cover 120 and the sleeve 130 to house oil, and by itself may act as a bearing that supports one side of the shaft. The reservoir 170 may be connected with the radial bearing 174 described above, to supply oil to the radial bearing. That is, the gap between the sleeve 130 and base cover 120 and the gap between the sleeve 130 and shaft 110 may be contiguous with each other, and the oil injected in each may flow freely and circulate.

The plate 150 may have the shape of a donut having a first hole in the center that is in correspondence with the cross-section of the shaft 110. The shaft 110 may be inserted and coupled in the first hole, and one side of the plate 150 may be mounted on one side of the sleeve 130.

While the plate 150 may be manufactured separately and then coupled with the shaft 110, the plate 150 may also be manufactured as a single body with the shaft 110 from the beginning of its manufacture, and may undergo rotating motion in accordance with the shaft 110 when the shaft 110 is rotated. A thrust bearing 171, which will be described below, may be interposed in the gap between the plate 150 and the sleeve 130.

The thrust bearing 171 may be a fluid bearing, which may be placed in the gap between the plate 150 and the sleeve 130. The thrust bearing 171 may support the plate 150, and may reduce friction between the plate 150 and the sleeve 130 to allow stable movement.

The thrust bearing 171 may be formed by injecting oil in the gap between the plate 150 and the sleeve 130, and may be connected with the radial bearing 174 described above. That is, the gap between the plate 150 and the sleeve 130 may be contiguous with the gap between the sleeve 130 and the shaft 110, and the oil injected in each may flow freely and circulate around the bearings.

Thus, the thrust bearing 171, the radial bearing 174, and the reservoir 170 may all be connected. While oil is suggested in this embodiment for forming the thrust bearing 171, it is apparent that various alternatives may be used according to design requirements.

The cap 140 may cover the outer perimeter and one side of the plate 150 to form a bearing space with the outer perimeter part 145 of the plate 150, and may be mounted on one side of the sleeve 130. A more secure coupling may be obtained by forming the cap 140 to have a shape that is in correspondence with the shape of the side of the sleeve 130 on which the cap 140 is mounted. Also, a cap bearing 173 may be placed in the bearing space confined by the outer perimeter part 145 of the plate 150 and the cap.

The cap bearing 173 may be a fluid bearing, which may be formed by injecting oil in the bearing space, and may be connected with the thrust bearing 171 described above. That is, the gap between the plate 150 and the sleeve 130 may be contiguous with the bearing space, and the oil injected in each may flow freely and circulate around the bearings. The cap bearing 173 may support the outer perimeter and the one side of the plate 150, and may maintain stable rotating movement of the plate 150.

The hub 160 may be coupled to one side of the shaft 110 and may be formed to extend in a direction perpendicular to the axis of the shaft 110. The hub 160 may receive driving power from a driving power generator composed of permanent magnets (not shown) and electromagnet parts (not shown), etc., to undergo rotating motion, at which the shaft 110 may also be made to undergo rotating motion in accordance with to the rotation of the hub 160.

While a set of permanent magnets (not shown) and electromagnet parts (not shown) formed adjacent to the permanent magnets coupled to the hub 160 has been suggested as a driving power generator, it is apparent that the components of the driving power generator and the coupling location of each component may be varied according to design requirements. For example, a first set of electromagnets may be coupled to the hub, with a second set of electromagnets coupled adjacent to the first electromagnets.

Various rotational bodies may be coupled to the outer perimeter of the hub 160, as necessary. For example, in the case of an LSU (laser scanning unit), a rotating polygonal mirror may be coupled, while in the case of a hard disk drive, a disk may be coupled.

As described above, the sleeve 130 may cover the outer perimeter of the shaft 110 to maintain stable rotating movement of the shaft 110. A penetration hole 139 is formed in the sleeve 130 through which the shaft 110 may be inserted, and as the shaft 110 is inserted in the penetration hole 139 and covered, the outer perimeter of the shaft 110 may be supported by the sleeve 130 during the rotating movement.

A convenient and secure manner of coupling may be obtained by forming a ledge 131 on the sleeve 130, such that the side to which the base cover 120 is coupled is sunken in, and forming the base cover to be in correspondence with such a shape of the sleeve 130.

Moreover, a convenient and secure manner of coupling may be obtained by forming a ledge 131' on the sleeve 130, such that the side to which the base cover 120 is coupled is protruded out, and forming the base cover to be in correspondence with the shape of the sleeve 130.

In a predetermined position on the sleeve 130, a contiguous hole (not shown) may be formed that connects the thrust bearing 171 and the reservoir 170. The oil forming the thrust bearing 171 and the oil forming the reservoir 170 may adequately circulate through the contiguous hole (not shown), whereby not only can the pressure created in each fluid bearing within the motor be made uniform, but also bubbles, etc., can be moved by the circulation so that they may readily be released.

Figure 5:
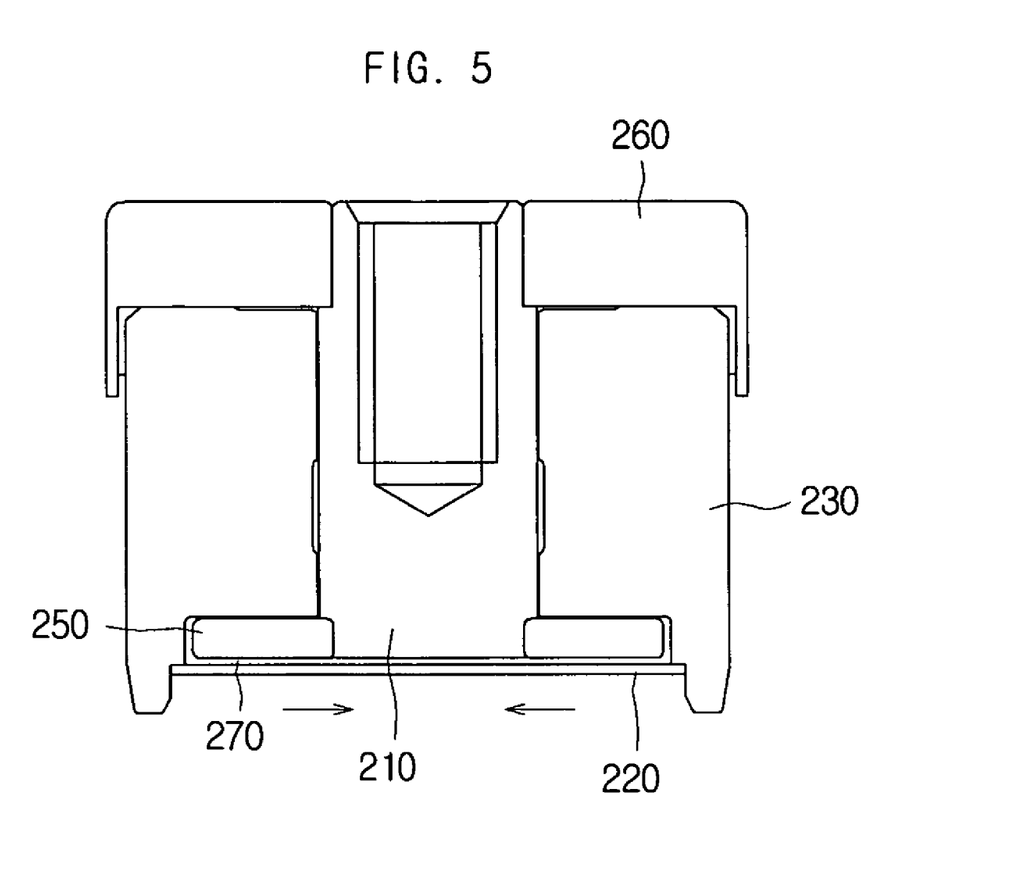
FIG. 5 is a cross-sectional view illustrating the structure of a motor according to a fourth embodiment.

While in certain embodiments of the claimed invention described above, a structure is described in which the plate 150 and the base cover 120 are coupled on different sides of the sleeve 130, the plate 250 and the base cover 220 may just as well be coupled on the same side, as illustrated in FIG. 5.

Here, with reference to FIG. 5, a sunken portion may be formed on the side of the sleeve 230 adjacent to the plate 250, that is in correspondence with the shape of the plate 250, for housing the plate 250.

As set forth above, a motor according to an embodiment of the claimed invention may have a base cover that covers one side of the rotating member and stationary member, where the base cover may be made of a material capable of elastic deforming, so that a support load may be applied from the side of the base cover to provide a secure coupling and manufacture. Thus, it is apparent that various embodiments may be obtained by changing, as necessary, the rotating member or stationary member, besides the base cover made of an elastically deformable material.

Figure 6:
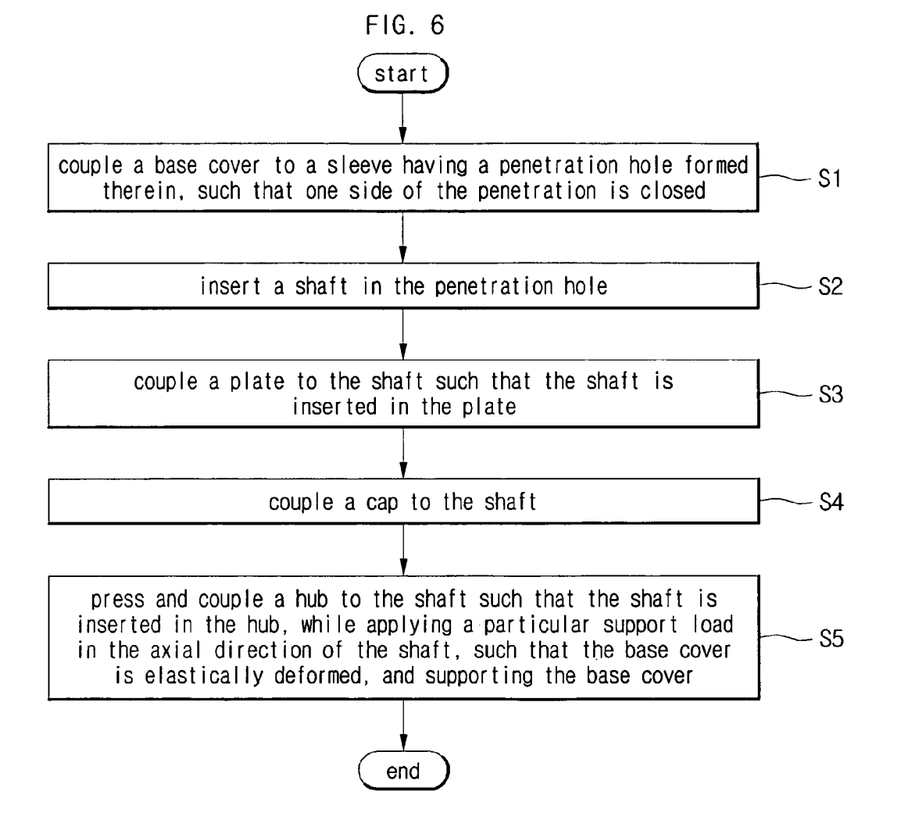
FIG. 6 is a flowchart illustrating a method of manufacturing a motor according to an embodiment.

Next, a method will be described of manufacturing a motor according to an embodiment of the claimed invention. FIG. 6 is a flowchart illustrating a method of manufacturing a motor according to an embodiment of the invention.

Operation S1 is that of coupling the base cover 120 to the sleeve 130 to close one side of the penetration hole. The shape of the coupling surface of the sleeve 130 and the corresponding shape of the base cover 120 may be varied for easier coupling of the base cover 120 and sleeve 130, and examples of which may be found in the shapes of the coupling surface of the sleeve 130 and the base cover 120 illustrated in FIGS. 2 to 5.

Operation S2 is that of inserting the shaft 110 in the penetration hole, where the shaft may be inserted in the penetration hole by positioning the shaft at a position that is in correspondence with the penetration hole, and by pressing on a surface of the shaft. Thus, the shaft 110 may be covered by the sleeve 130.

Operation S3 is that of coupling the plate 150 to the shaft 110, so that the shaft 110 may be inserted in the first hole of the plate 150. This allows the plate 150 to undergo rotating motion according to the rotation of the shaft 110 and to be supported by the sleeve 130 on which the plate 150 is mounted.

While operation S3 may be performed after operation S2, operation S2 may just as well be performed after operation S3. In other words, the order of the operations described above may be varied as necessary.

Operation S4 is that of coupling the cap 140 to the sleeve 130. As described with regards the motor described above, the cap 140 is a component that may cover the outer perimeter and one side of the plate 150 to form a bearing space with the outer perimeter part 145 of the plate 150, and may be mounted on one side of the sleeve 130. Thus, by coupling the cap 140 to the sleeve 130, the coupling relationship between the plate 150 and sleeve 130 may be made secure, and by the subsequent coupling of the hub, an even stronger coupling relationship may be obtained.

Operation S5 is of pressing and coupling the hub 160 to the shaft 110 such that the shaft 110 is inserted in the hub 160, while applying a particular support load in the axial direction of the shaft 110, such that the base cover 120 is elastically deformed, and supporting the base cover 120. This will be described in more detail with reference to FIGS. 7 and 8.

Figure 7:
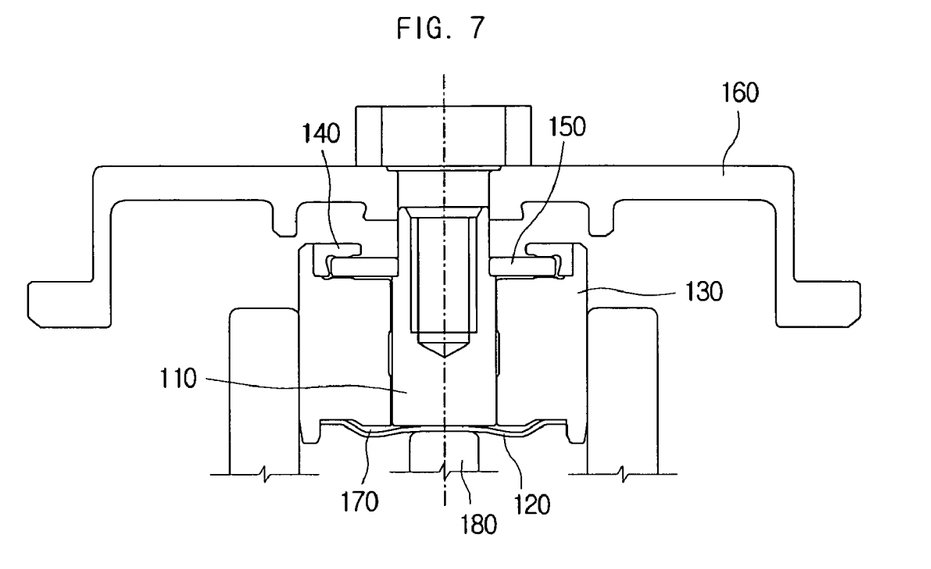
FIG. 7 is a cross-sectional view illustrating a process in the method of manufacturing a motor of FIG. 6.
Figure 8:
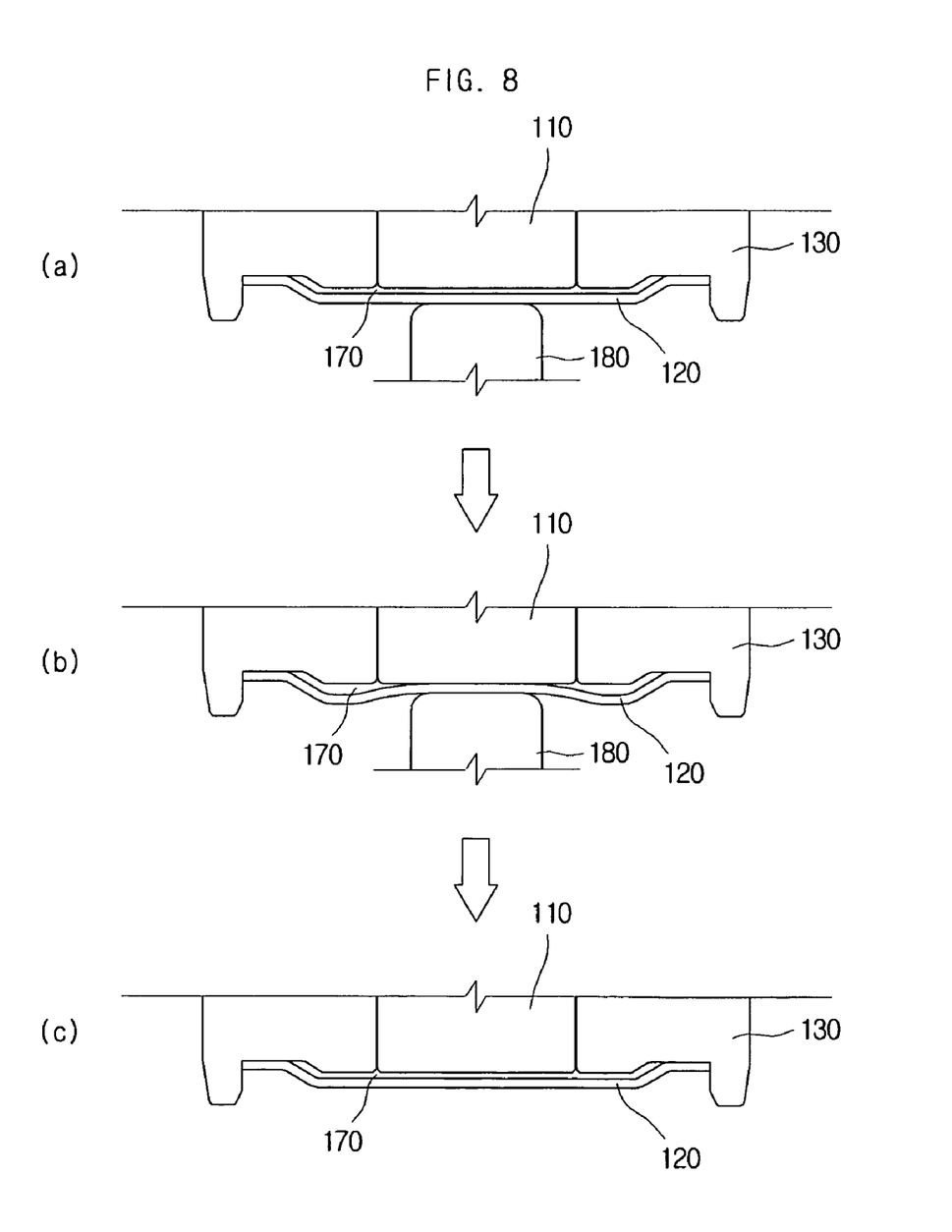
FIG. 8 is a cross-sectional view illustrating the deforming of the cover according to the process of FIG. 7

FIG. 7 is a cross-sectional view illustrating a process in the method of manufacturing a motor of FIG. 6, and FIG. 8 is a cross-sectional view illustrating the deforming of the cover according to the process of FIG. 7. In FIGS. 7 and 8 are illustrated a shaft 110, base cover 120, sleeve 130, cap 140, plate 150, hub 160, and jig 180.

In a method of manufacturing a motor according to this embodiment, when performing the process of pressing the hub 160 so as to couple the shaft 110 and the hub 160, as illustrated in FIG. 7, a particular support load may be applied by the jig 180 in the axial direction of the shaft 110 so that the base cover 120 undergoes elastic deforming. Thus, the base cover 120 may be deformed within the range of elastic deforming to touch a side of the shaft 110, which adds to the load on the shaft 110 to complement the pressure applied on the hub 160. In this way, the amount of pressure applied on the hub 160 may be reduced, and the force concentrated on the portion where the shaft 110 and the plate are coupled may also be reduced, to resolve some of the problems of prior art described above.

When the support load applied by the jig 180 is removed after the coupling of the hub 160 and shaft 110 is complete, the base cover 120 may recover its shape before deforming by means of the elastic force of the base cover 120 itself. Thus, the dimensions considered in the design stages may be ensured, and deviations that may occur during manufacture may be minimized.

FIG. 8 is a cross-sectional view illustrating the deforming of the cover according to the process of FIG. 7, where drawing (a) illustrates the base cover 120 before applying a support load, drawing (b) illustrates the base cover 120 while the support load is being applied by the jig 180, and drawing (c) illustrates the base cover 120 that has recovered its shape before deforming, after the support load has been removed. The deforming of the base cover 120 described above may be observed in the drawings (a) to (c) of FIG. 8.

In designing the base cover 120, an additional operation may be included of determining elasticity factors (for example, thickness or material) of the base cover 120 in consideration of the support load applied by the jig 180, and the gap between the base cover 120 and the sleeve 130, etc. Also, an additional operation may also be included of determining the magnitude of the support load applied by the base cover, in consideration of the elasticity factors of the base cover. A method such as the FEM (finite element method) may be used.

As set forth above, with a motor and a method of manufacturing the motor according to certain aspects of the invention, deviations from the designed dimensions may be reduced to provide improved precision, by using a base cover made of an elastically deformable material that can be made to touch the shaft by pressing.

While the spirit of the invention has been described in detail with reference to particular embodiments, the embodiments are for illustrative purposes only and do not limit the invention. In addition, numerous embodiments besides those set forth above are encompassed in the claimed invention. It is to be appreciated that those skilled in the art can change or modify the embodiments without departing from the scope and spirit of the invention.

What is claimed is:

1. A method of manufacturing a motor, the method comprising:
   coupling a base cover to a sleeve having a penetration hole formed therein, such that one side of the penetration hole is closed;
   inserting a shaft in the penetration hole;
   coupling a plate to the shaft such that the shaft is inserted in the plate; and
   pressing and coupling a hub to the shaft such that the shaft is inserted in the hub while a support load is applied in an axial direction of the shaft to the base cover by using a jig,
   wherein the base cover is elastically deformed to make contact with the shaft, and
   the jig is used to deform the base cover so as to come in contact with the shaft, thereby applying the support load in the axial direction.

2. The method of claim 1, further comprising coupling a cap to the sleeve such that the plate is covered by the cap, between the coupling of the plate and the pressing and coupling of the hub.

3. The method of claim 1, further comprising injecting a fluid in a gap between the sleeve and the shaft and in a gap between the shaft and the base cover.

* * * * *